United States Patent
Talley et al.

(10) Patent No.: US 8,121,092 B1
(45) Date of Patent: Feb. 21, 2012

(54) METHODS AND SYSTEMS FOR SELECTING A LOW-COST INTERNET BASE STATION (LCIB) FOR A MACRO-NETWORK-TO-LCIB HANDOFF OF AN ACTIVE MOBILE STATION

(75) Inventors: Ryan S. Talley, Overland Park, KS (US); Bryan T. Barbee, Olathe, KS (US); Timothy W. Sill, Platte City, MO (US); Benjamin E. Bittfield, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 588 days.

(21) Appl. No.: 12/276,880

(22) Filed: Nov. 24, 2008

(51) Int. Cl.
*H04W 4/00* (2009.01)

(52) U.S. Cl. ......................................... 370/331; 370/338

(58) Field of Classification Search .................. None
See application file for complete search history.

(56) References Cited

U.S. PATENT DOCUMENTS

| 7,295,531 | B2 * | 11/2007 | Wheatley et al. | 370/328 |
| 7,903,599 | B1 * | 3/2011 | Talley et al. | 370/318 |
| 7,929,970 | B1 * | 4/2011 | Gunasekara et al. | 455/444 |
| 2004/0204097 | A1 | 10/2004 | Scheinert et al. | |
| 2008/0117866 | A1 * | 5/2008 | Claussen et al. | 370/329 |
| 2009/0052395 | A1 * | 2/2009 | Bao et al. | 370/331 |
| 2010/0056104 | A1 * | 3/2010 | Butler et al. | 455/410 |

* cited by examiner

*Primary Examiner* — Chi Pham
*Assistant Examiner* — Soon-Dong Hyun (57) ABSTRACT

Methods and systems are provided for selecting a low-cost Internet base station (LCIB) for a macro-network-to-LCIB handoff of an active mobile station. In one embodiment, a handoff request is received from a mobile station, the handoff request indicating that the mobile station is requesting that a first pseudorandom number (PN) offset be added to an active set for the mobile station, the active set comprising one or more macro-network sectors. It is determined that the first PN offset is associated with an LCIB pilot beacon, and a candidate set of LCIBs is responsively identified, the candidate set consisting of substantially all of the LCIBs that are located in the one or more macro-network sectors in the active set. It is determined whether the mobile station is an authorized mobile station of exactly one LCIB in the candidate set and, if so, the mobile station is directed to handoff to that LCIB.

20 Claims, 5 Drawing Sheets

METHODS AND SYSTEMS FOR SELECTING A LOW-COST INTERNET BASE STATION (LCIB) FOR A MACRO-NETWORK-TO-LCIB HANDOFF OF AN ACTIVE MOBILE STATION

BACKGROUND

1. Macro Cellular Wireless Networks

Many people use mobile stations, such as cell phones and personal digital assistants, to communicate with macro cellular wireless networks (a.k.a. wireless wide area networks (WWANs), which typically provide communication services such as voice, text messaging, and packet-data communication. These mobile stations and networks typically communicate with each other over a radio frequency (RF) air interface according to a wireless protocol. Mobile stations typically conduct wireless communications with these networks via one or more base transceiver stations (BTSs), each of which are arranged to send communications to and receive communications from mobile stations over the air interface.

Each BTS is in turn communicatively connected with a network entity known as a base station controller (BSC) (sometimes referred to as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. As examples, an MSC may interface with the well-known public switched telephone network (PSTN), and a PDSN may interface with one or more core packet data networks and/or the global Internet. As such, mobile stations can typically communicate over the one or more signaling and/or transport networks from anywhere inside the coverage area of one or more BTSs, via the BTS(s), a BSC, and a switch or gateway such as an MSC and/or PDSN.

The base stations (i.e. BTSs or combinations of one or more BTSs and a BSC) for these macro cellular networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network." And the BTSs associated with macro networks may be referred to herein as macro BTSs (or just BTSs).

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This approach is known as frequency division duplex (FDD). And the base-station-to-mobile-station link is known as the forward link, while the mobile-station-to-base-station link is known as the reverse link.

2. Low-Cost Internet Base Stations (LCIBs)

Many macro-network subscribers, including private consumers and small businesses, among others, in addition to having wireless service (which may include data service) for their mobile station(s), also have high-speed (a.k.a. "broadband") Internet access through another communication channel, which may be cable-modem service, digital-subscriber-line (DSL) service, satellite-based Internet service, and/or some other option or combination thereof.

In one arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a wireless packet-data interface to, as examples, laptop computers, digital video recorders (DVRs), appliances, and/or any other computing devices or their respective wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells, femto base stations, femto BTSs, picocells, pico base stations, pico BTSs, microcells, micro base stations, micro BTSs, and by other names. Note that the aforementioned terms that end in "cell" may also be generally and herein used to refer to the coverage area provided by the respective device. Note also that "low-cost" is not used herein as a limiting term; that is, devices of any monetary cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (e.g. CDMA and EV-DO) are supported), and also transmit what is known as a pilot beacon, which includes administrative messages and parameters that mobile stations use to connect with the LCIB. And LCIBs typically include a Global Positioning System (GPS) receiver for use in receiving and decoding GPS signals, for use in determination of location, as well as for use in synchronizing operations with other LCIBs and/or the macro network, based on timing information embedded in GPS signals. Typically, LCIBs have fairly comprehensive auto-configuration capabilities, such that they are largely "plug-and-play" to the user.

SUMMARY

Methods and systems are provided for selecting an LCIB for a macro-network-to-LCIB handoff of an active mobile station. In one aspect, an embodiment may take the form of a method, in accordance with which a handoff request is received from a mobile station, the handoff request indicating that the mobile station is requesting that a first pseudorandom number (PN) offset be added to an active set for the mobile station, the active set comprising one or more macro-network sectors. It is determined that the first PN offset is associated with an LCIB pilot beacon, and a candidate set of LCIBs is responsively identified, the candidate set consisting of substantially all of the LCIBs that are located in the one or more macro-network sectors in the active set. It is determined whether the mobile station is an authorized mobile station of exactly one LCIB in the candidate set and, if so, the mobile station is directed to handoff to that LCIB.

In another aspect, an embodiment may take the form of a method for selecting an LCIB to which to instruct a mobile station engaged in an active communication session via a macro network on a first macro-network carrier to handoff. In accordance with the method, a handoff request is received from the mobile station, the handoff request indicating that the mobile station is requesting that a first PN offset be added to an active set for the mobile station, the active set comprising one or more macro-network sectors. It is determined that the first PN offset is associated with an LCIB pilot beacon; responsively, the handoff request is initially denied, and a candidate set of LCIBs is identified, the candidate set consisting of substantially all of the LCIBs that are located in the one or more macro-network sectors in the active set.

It is determined whether the mobile station is an authorized mobile station of exactly one LCIB in the candidate set and, if so, the mobile station is directed to handoff to that LCIB. If not, the candidate set is modified by removing (a) any LCIBs that are operating in a restricted mode and for which the mobile station is not an authorized mobile station and (b) any LCIBs that use a PN offset other than the first PN offset for emitting a respective pilot beacon. It is determined whether, within an immediately preceding time period, the mobile station registered with an LCIB in the modified candidate set and, if so, the mobile station is directed to handoff to that LCIB. If not, the LCIBs in the modified candidate set are instructed to report a reverse noise rise (RNR) on the first macro network carrier, and the mobile station is directed to handoff to whichever LCIB in the modified candidate set reports the greatest RNR on the first carrier.

In another aspect, an exemplary embodiment may take the form of a macro-network entity such as a mobile switching center (MSC) programmed to carry out either of the above-described- or any herein described-method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As mentioned above, an LCIB typically emits a pilot beacon—comprising messages and parameters—that aids mobile stations in initiating communication with the LCIB. The LCIB typically emits this pilot beacon on one or more carriers ("macro carriers") on which service is provided by the surrounding macro network. If service is provided by the surrounding macro network on only one macro carrier, the LCIB will emit its pilot beacon on that macro carrier. If, as is often the case, service is provided by the surrounding macro network on multiple macro carriers, the LCIB may sequentially step through emitting its pilot beacon on some number of those carriers; that is, the LCIB's pilot beacon may "hop" on a fixed number of macro carriers, and in that scenario is referred to as a frequency-hopping pilot beacon.

The LCIB's pilot beacon aids mobile stations in handing off to the (typically one) carrier ("LCIB carrier") on which the LCIB provides traffic-bearing services to mobile stations. Note that this LCIB carrier is typically different than the macro carrier(s) on which service is provided by the surrounding macro network. The LCIB broadcasts its pilot beacon using a pseudorandom number (PN) offset. Service providers typically designate a finite number of PN offsets to be used by LCIBs for their pilot beacons. These PN offsets may be referred to herein as "LCIB PN offsets" or just "LCIB PNs." Because there are almost always many more deployed LCIBs than there are unique LCIB PNs, the service provider will reuse LCIB PNs.

As referenced above, macro-network service providers have deployed—and continue to deploy—numerous LCIBs; and the respective coverage areas of these LCIBs very frequently—in fact almost universally—overlap that of one or more macro-network coverage areas (e.g. sectors provided by macro base stations). A mobile station that is idling on (i.e. is idle or is in idle mode) or in an active call or data session (i.e. is active or is in active mode) with the macro network on a given macro carrier may detect on that macro carrier one or more pilot beacons from one or more LCIBs (i.e. may detect one or more LCIB PNs). If the mobile station detects a sufficiently strong LCIB pilot beacon, the mobile station may request soft handoff to that LCIB, a request that typically takes the form of the mobile station requesting addition of a PN—in this case the LCIB PN—to its active set (defined below).

And handoff of a mobile station between the macro network and an LCIB may occur in either direction (i.e. from the macro network to the LCIB, or vice versa); furthermore, handoffs may occur when the mobile station is in idle mode (i.e. not engaged in an active communication session) or when the mobile station is active (i.e. engaged in an active communication session). Idle-mode handoffs are fairly well understood in both directions, as are active-mode handoffs from an LCIB to the macro network, the latter involving identifying a target macro sector.

Active-mode handoffs from the macro network to an LCIB are often problematic, however, and are the focus of the presently disclosed methods and systems. In operation, as mentioned, an active mobile station may detect an LCIB PN that is associated with a signal strength that is strong enough to trigger the mobile station to request that the LCIB PN be added to its active set, which generally is a set of a finite number (often six) of PNs that represent the sectors for which the mobile station is currently observing the best signals, and therefore with which the mobile station is simultaneously conducting its active session.

As noted above, however, an LCIB PN is associated with the LCIB's pilot beacon, and is not associated with the LCIB's traffic-bearing carrier; thus, the LCIB PN is not a valid candidate for soft handoff, and therefore this request will be refused by the service provider's network (e.g. by an MSC). This request, however, is a signal that the mobile station is requesting to be handed off to an LCIB. It is then desirable, to the greatest extent possible, to select the correct LCIB to which to handoff the mobile station. Since macro carriers and LCIB carriers are often mutually exclusive, such a handoff will often be a hard handoff, as it will involve the mobile station switching its active session from a macro carrier to an LCIB carrier.

In many situations, a mobile station may detect multiple LCIBs that meet its handoff criteria, where one of those LCIBs belongs to the user of that mobile station. In that case, the user and the service provider would clearly prefer that that user's mobile station handoff to that user's LCIB. In general then, service providers strive to improve decision-making as to when to handoff an active mobile station to an LCIB, and further to improve identification of the correct LCIB to which to handoff, especially when multiple LCIBs may be in close proximity.

Note further that LCIBs can typically be configured to operate in what are referred to as a "restricted mode" and or rather in an "unrestricted mode." In restricted mode, the conducting of communication sessions via the LCIB is restricted to a list of authorized mobile stations. In unrestricted mode, the conducting of communication sessions via the LCIB is not restricted to any such list, but instead is available to any suitable mobile station.

In accordance with the presently described methods and systems, an active mobile station sends a request to one or more entities of the macro network to add a given PN offset to its active set, where that PN offset is associated with the pilot beacon of an LCIB, and not with a traffic-bearing carrier provided by the LCIB; in other words, the mobile station is requesting that an LCIB PN be added to the mobile station's active set. The mobile station may send the request message to an MSC and/or some other macro-network entity. For ease of explanation, such communications are described at points herein as being between the mobile station and the macro network, though of course one or more particular entities (e.g. an MSC, one or more switches and/or servers, etc.) would be involved.

The macro network initially rejects this request, since the LCIB PN is associated with an LCIB's pilot beacon and not with any valid traffic-bearing carrier, LCIB or otherwise. Also in response to receiving this request, the macro network identifies which LCIBs are located in the macro-network serving sectors in the mobile station's active set. Recall that LCIBs typically include a GPS receiver or other hardware for location determination; in some embodiments, LCIB location may be manually entered by a user, and other ways of having access to an LCIB's location could be used as well, without departing from the present methods and systems.

As such, the macro network will have identified a candidate set of LCIBs located in the footprint(s) of the macro-network serving sector(s) in the mobile station's active set. The preferred (e.g. the mobile station user's own) LCIB for the mobile station to handoff to is among this candidate set. Note that "candidate set" as used herein is not meant to be confused with the use of the same phrase in connection with macro-network service, where that phrase refers to a set of macro sectors that are candidates to be added to the mobile station's active set.

The macro network then determines whether the mobile station is an authorized mobile station (i.e. on the list of authorized mobile stations) of any of the LCIBs in the candidate set. If exactly one LCIB in the candidate set matches this criterion, the macro network directs the mobile station to handoff to that LCIB. If this criterion is not met, the macro network then trims the candidate set by removing therefrom any LCIBs that are operating in restricted mode and do not have the mobile station on their authorized list, as well as any LCIBs that are emitting their pilot beacons using LCIB PNs other than the one from the mobile station's handoff request. Note that the macro network may accordingly maintain data as to locations, current mode (i.e. restricted or unrestricted), LCIB PN used for pilot beacon, and/or one or more other pieces of information usable and suitable for carrying out the present methods and systems.

The macro network will then check whether the mobile station recently registered with an LCIB among those remaining in the candidate set and, if so, direct the mobile station to handoff to that LCIB. If that condition is not met, the macro network will instruct the remaining LCIBs in the candidate set to listen for an increase in reverse noise rise (RNR) on the macro carrier on which the mobile station is conducting the active call. The macro network will then direct the mobile station to handoff to whichever of those LCIBs reports the greatest RNR on that macro carrier. Note that this use of RNR increase serves as an indicator as to which LCIB the mobile station is currently approaching. Note further that RNR refers to a comparison of (i) a current level of detected noise on the reverse link with (ii) a baseline level of noise on the reverse link, and that this baseline level could correspond to an average of measurements taken over some preceding time period, such as the previous 24 hours, week, month, or some other time period. In some embodiments, the baseline could be an average of the 24-hour lows over the previous week, and certainly many other examples are possible.

Note further that directing a mobile station to handoff to an LCIB may involve sending the mobile station a directive message to re-tune to the traffic-bearing carrier provided by the LCIB and operate thereon, and perhaps also to report the PN offset of that carrier to the macro network, perhaps for confirmation or as a final trigger of the handoff. And the mobile station may also report the signal strength of the LCIB's traffic carrier as measured by the mobile station. In general then, in accordance with the present methods and systems, the probability that the mobile station will be directed to handoff to the preferred LCIB is enhanced.

And it should be noted that the above overview is illustrative and not limiting. That is, additional and/or different features may be present in some embodiments. It should be noted as well that any description of a mobile station, an LCIB, and/or a macro network operating according to any particular protocol such as 1xRTT CDMA is by way of example, and that any suitable protocol(s) may be used instead, such as EV-DO, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. An Exemplary Communication System

Figure 1A:
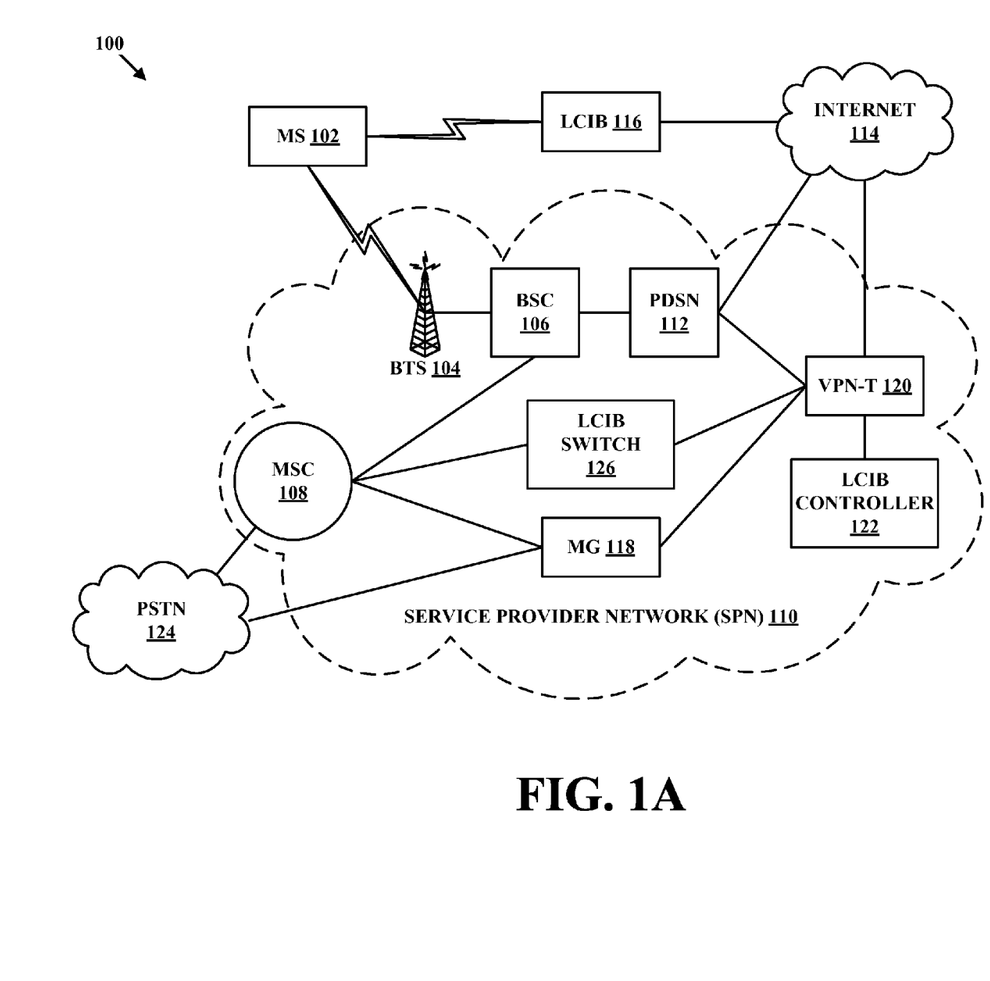
FIG. 1A depicts a communication system, in accordance with exemplary embodiments.

FIG. 1A is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1A, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, and an LCIB switch 126. And additional entities could be present as well, such as additional mobile stations in communication with macro BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also or instead be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more (e.g. CDMA) coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 118, LCIB switch 126, and PSTN 124. In general, MSC 108 acts as a switch between (a) PSTN 124 and (b)(i) one or more BSCs such as BSC 106 and (ii) one or more LCIB switches such as LCIB switch 126, facilitating communication between mobile stations and PSTN 124, which may be the public switched telephone network.

Service-provider network 110 may encompass all of the network elements depicted in FIG. 1A as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and LCIBs.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include (a) a wireless interface for communicating with one or more mobile stations according to a protocol such as CDMA (and/or one or more other technologies) and (b) an Ethernet or WiFi interface for communicating with a device such as a router and/or a cable modem. LCIB 116 may also have a GPS receiver and/or other location module. LCIB 116 is also described in connection with FIG. 2.

Figure 1B:
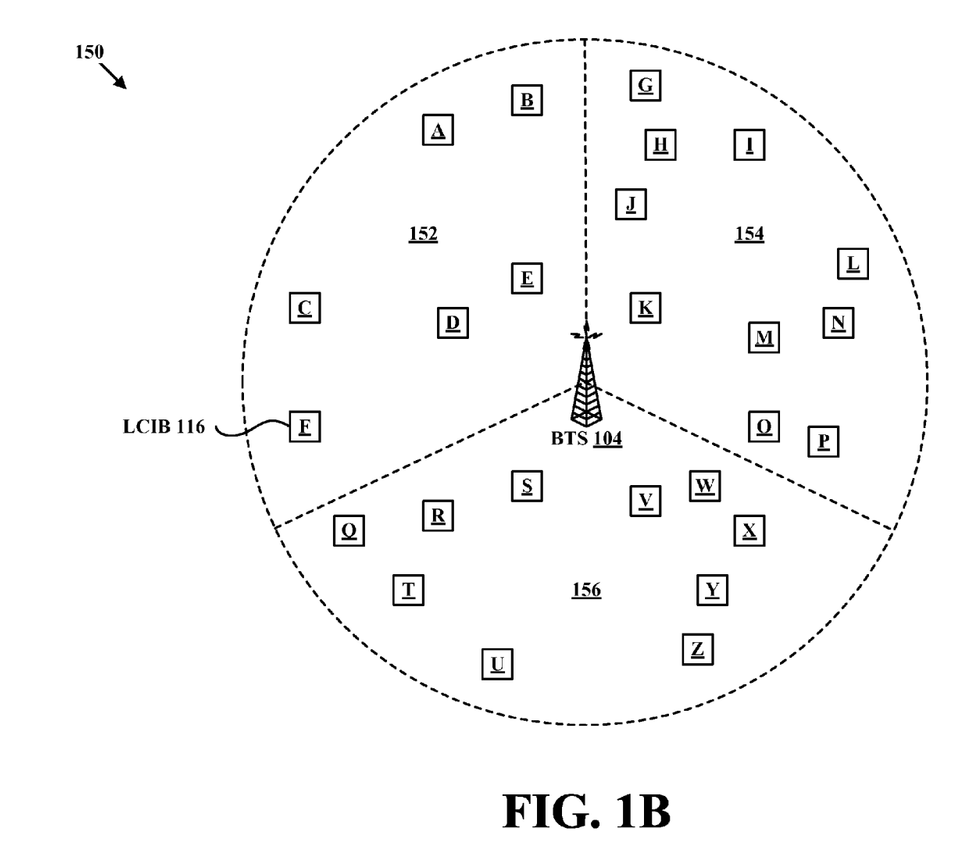
FIG. 1B depicts multiple sectors provided by a macro base transceiver station (BTS), as well as exemplary locations of numerous low-cost Internet base stations (LCIBs), in accordance with exemplary embodiments.

In general, as depicted in FIG. 1B, a service provider may deploy numerous LCIBs, all or almost all of which will be located within at least one macro-network coverage area, such as a sector. FIG. 1B depicts a coverage area 150 divided into three exemplary sectors 152, 154, and 156 provided by macro BTS 104. Note that macro BTS 104 may provide service on one or more macro carriers in sectors 152, 154, and 156. FIG. 1B depicts LCIBs A-F being located in sector 152, LCIBs G-P being located in sector 154, and LCIBs Q-Z being located in sector 156. This is of course by way of example, as any given macro-network sector or other coverage area may have between zero and any positive number of LCIBs located therein. In the example of FIG. 1B, LCIB F in sector 152 is shown as being LCIB 116 of FIGS. 1A and 2, though this is of course arbitrarily selected by way of example.

In general, the macro network (i.e. the macro-network service provider by way of one or more macro-network entities such as MSC 108, LCIB controller 122, and/or LCIB switch 126) may maintain data reflecting various attributes of these various LCIBs, such as location, identification of in which macro sector if any they are located, PN offset used for pilot-beacon transmission, traffic-bearing carrier and PN offset, transmission power, and/or any other suitable descriptors, operating-parameter values, characteristics, etc.

Returning to FIG. 1A, media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least MG 118, LCIB controller 122, LCIB switch 126, and Internet 114. In general, VPN terminator 120 functions to establish secure VPN connections over Internet 114 with LCIBs such as LCIB 116, enabling the LCIBs to securely communicate with devices on SPN 110 and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on SPN 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacons to be broadcast, transmission-power level), and to transmit those parameters to LCIBs, perhaps along with other configuration data and messaging.

LCIB switch 126 may be any networking element arranged to carry out the LCIB-switch functions described herein. As such, LCIB switch 126 may include a communication interface, a processor, and data storage comprising instructions executable by the processor for carrying out those LCIB-switch functions. The communication interface may include one or more wired and/or wireless interfaces for communicating with at least MSC 108 and VPN terminator 120. In general, LCIB switch 126 acts as a switch between MSC 108 and VPN terminator 120, enabling mobile stations communicating via LCIBs to engage in calls over PSTN 124 via MSC 108.

b. An Exemplary LCIB

Figure 2:
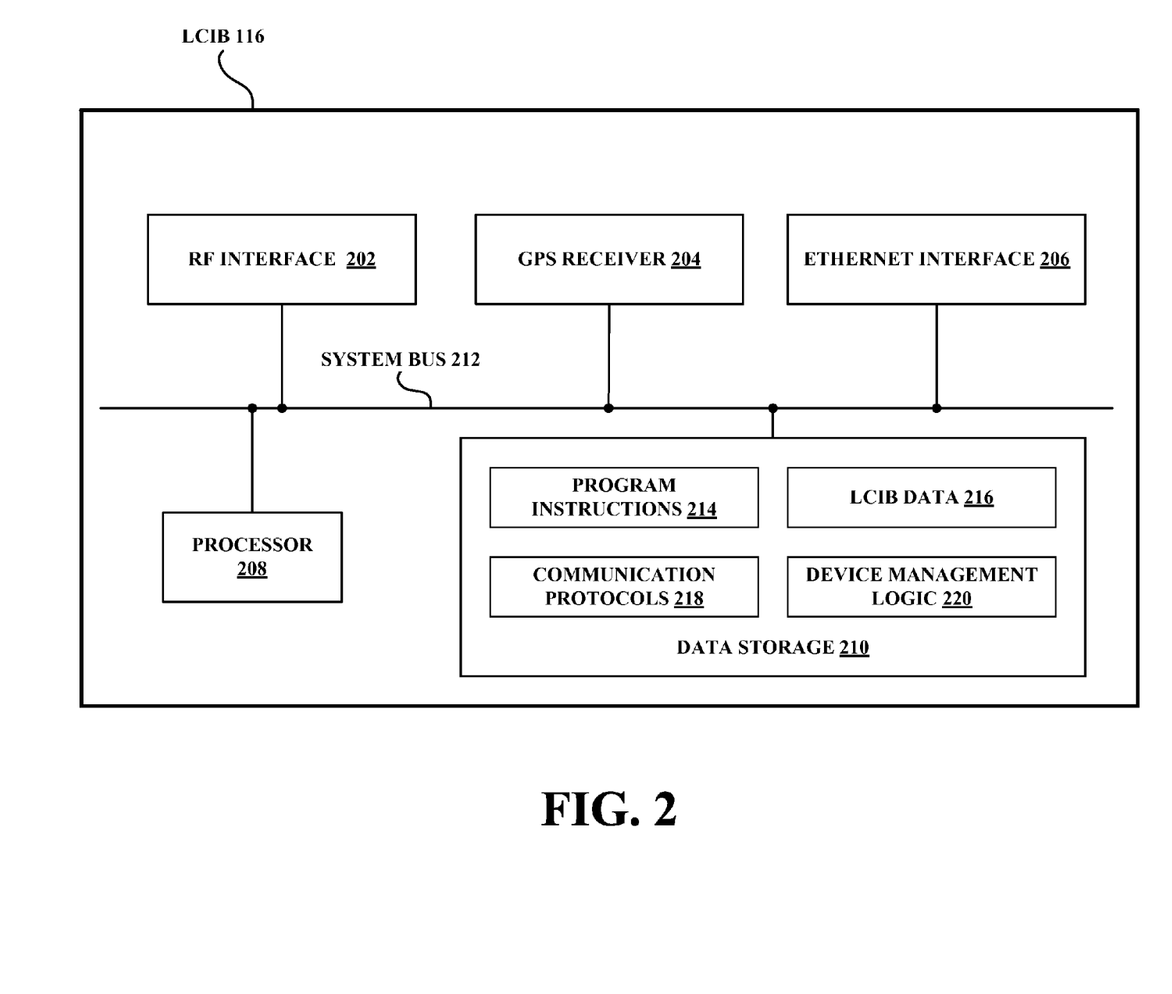
FIG. 2 depicts an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example. Note further that one or more other devices described herein may have structures having some or all of these components; for example, MSC 108, LCIB controller 122, and/or LCIB switch 126 may each have an Ethernet interface, a processor, and data storage having appropriate instructions stored therein and executable for carrying out the appropriate functions.

RF interface 202 may include one or more antennas, one or more chipsets, a set of one or more channel elements, and/or one or more other components suitable for providing a wireless coverage area according to a wireless-communication protocol such as CDMA (and/or one or more other technologies). GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
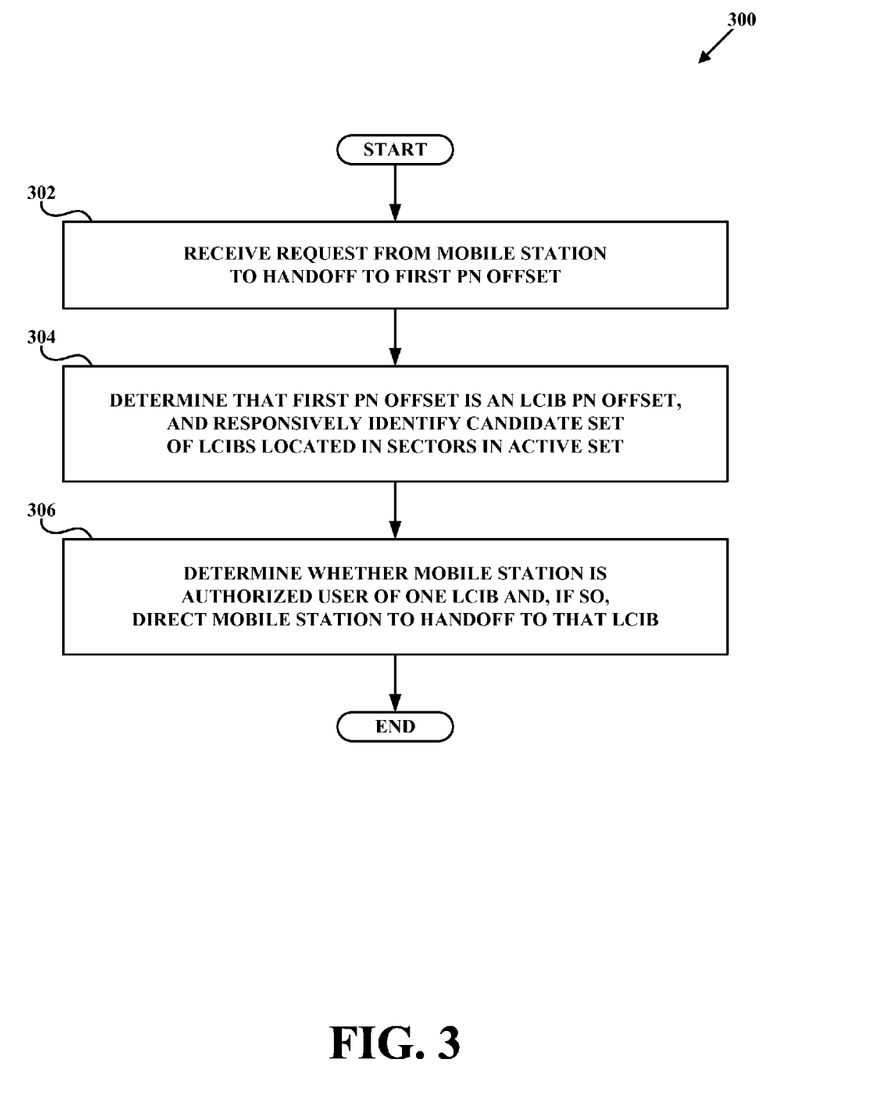
FIG. 3 depicts a flowchart of a method, in accordance with exemplary embodiments.

FIG. 3 depicts a flowchart of an exemplary method 300, in accordance with an exemplary embodiment. Method 300 is a method for selecting an LCIB to which to instruct a mobile station to handoff, and is described as being carried out by a macro network; in some embodiments, method 300 may be carried out by an MSC, such as MSC 108, an LCIB controller, such as LCIB controller 122, an LCIB switch, such as LCIB switch 126, a server, some other macro-network entity, or perhaps some combination and/or multiple of the foregoing. In general, method 300 could be carried out by any one or any combination of the network elements described herein, or any other network element(s).

As shown in FIG. 3, method 300 begins at step 302, when the macro network receives a handoff request from mobile station 102, where the handoff request indicates that mobile station 102 is requesting that a first PN offset be added to its active set, which includes one or more (e.g. six) macro-network sectors.

At step 304, the macro network determines that the first PN offset is associated with an LCIB pilot beacon, perhaps that of LCIB 116, and perhaps by referencing a table of PN offsets used for LCIB pilot beacons. In response to making that determination, the macro network identifies a candidate set of LCIBs, the candidate set consisting of all—or substantially all—of the LCIBs that are located in the one or more macro-network sectors in mobile station 102's active set. In this example, mobile station's active set is {sector 152, sector 154, sector 156}, and thus the candidate set is {LCIB A through LCIB Z}.

Note that the macro network may maintain data reflecting macro-sector footprints and LCIB locations, perhaps in the form of a table correlating macro sectors with LCIBs located therein, making the compilation of the candidate set a matter of looking up each active-set sector in such a table. Note as well, that, further in response to determining that the first PN offset is associated with an LCIB pilot beacon, the macro network may initially deny the handoff request.

At step 306, the macro network determines whether mobile station 102 is an authorized mobile station of exactly one LCIB in the candidate set and, if so, directs the mobile station to handoff to that LCIB. If, for example, mobile station 102 was listed as an authorized mobile station of LCIB 116 and none of the other LCIBs in the candidate set, then the macro network would direct mobile station 102 to handoff to LCIB 116.

If it is not the case that the mobile station is an authorized mobile station of exactly one LCIB in the candidate set, then the macro network may modify the candidate set by removing therefrom: (a) any LCIBs that are operating in restricted mode and for which mobile station 102 is not an authorized mobile station and (b) any LCIBs that use a PN offset other than the first PN offset for emitting a respective pilot beacon. The macro network may then determine whether, within an immediately preceding time period (e.g. one hour, one day, etc.), mobile station 102 registered with an LCIB in the modified candidate set and, if so, direct mobile station 102 to handoff to that LCIB.

In an embodiment, mobile station 102 is engaged in an active communication session (e.g. voice call, data session, etc.) via the macro network on a first macro-network carrier. As such, if it is not the case that, within the immediately preceding time period, mobile station 102 registered with an LCIB in the modified candidate set, then the macro network may direct mobile station 102 to handoff to whichever LCIB in the modified candidate set reports a greatest reverse noise rise (RNR) on the first macro-network carrier. Note that the macro network may first instruct the LCIBs in the modified candidate set to report the RNR on the first macro network carrier, and may then receive reports from the LCIBs in the modified candidate set, the reports reflecting the RNR on the first macro network carrier as measured at the respective LCIBs.

In an embodiment, mobile station 102 detected the first PN offset on the first macro-network carrier, and responsively sent the handoff request to the macro network. In an embodiment, the LCIB to which mobile station 102 is instructed to handoff is associated with a user of mobile station 102. In an embodiment, directing mobile station 102 to handoff to a given LCIB involves sending mobile station 102 a directive message to re-tune to and operate on a traffic-bearing carrier provided by the given LCIB. The macro network may also instruct mobile station 102 to report a PN offset of the traffic-bearing carrier provided by the given LCIB. In an embodiment, mobile station 102, the macro network, and the LCIB operate according to a code division multiple access (CDMA) protocol.

b. A Second Exemplary Method

Figure 4:
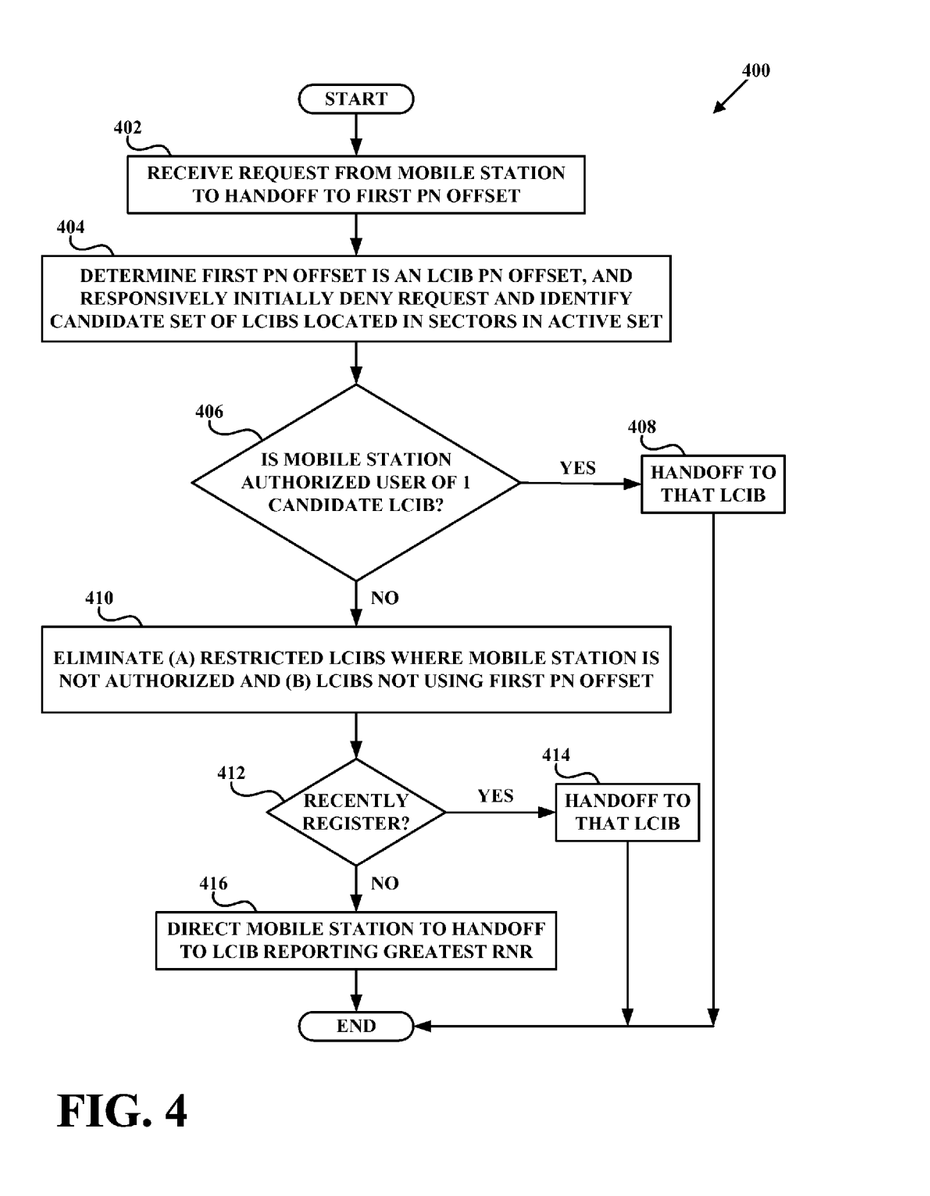
FIG. 4 depicts a flowchart of a method, in accordance with exemplary embodiments.

FIG. 4 depicts a second exemplary method 400, in accordance with an embodiment. Method 400 of FIG. 4 is similar in many ways to method 300 of FIG. 3, and thus is not described in as great of detail. It is explicitly contemplated that all possibilities and permutations discussed with respect to method 300 could apply equally to method 400. Furthermore, method 400 may be carried out by any entity discussed as a possibility for carrying out method 300, and/or any other entity. In general, method 400 is a method for selecting an LCIB to which to instruct a mobile station (e.g. mobile station 102) engaged in an active communication session via a macro network on a first macro-network carrier to handoff.

At step 402, the macro network receives a handoff request from mobile station 102, where the handoff request indicates that mobile station 102 is requesting that a first PN offset be added to its active, which includes one or more macro-network sectors. At step 404, the macro network determines that the first PN offset is associated with an LCIB pilot beacon; and responsively (a) initially denies the handoff request and (b) identifies a candidate set of LCIBs, where the candidate set consists of substantially all of the LCIBs that are located in the one or more macro-network sectors in mobile station 102's active set.

At step 406, the macro network determines whether mobile station 102 is an authorized mobile station of exactly one LCIB in the candidate set. If so, at step 408, the macro network directs mobile station 102 to handoff to that LCIB, and the method ends. If not, at step 410, the macro network modifies the candidate set by removing therefrom: (a) any LCIBs that are operating in restricted mode and for which mobile station 102 is not an authorized mobile station and (b)

any LCIBs that use a PN offset other than the first PN offset for emitting their respective pilot beacon.

At step 412, the macro network determines whether, within an immediately preceding time period (e.g. one hour, one day, one week, etc.), mobile station 102 registered with an LCIB in the modified candidate set. If so, at step 414, the macro network directs mobile station 102 to handoff to that LCIB. If not, at step 416, the macro network instructs the LCIBs in the modified candidate set to report the RNR that they detect on the first macro-network carrier, and directs mobile station 102 to handoff to whichever LCIB in the modified candidate set reports the greatest RNR on the first macro-network carrier.

4. Conclusion

Various exemplary embodiments have been described above. Those skilled in the art will understand, however, that changes and modifications may be made to those examples without departing from the scope of the claims.

The invention claimed is:

1. A method for selecting a low-cost Internet base station (LCIB) to which to instruct a mobile station to handoff, the method comprising:
   receiving a handoff request from the mobile station, the handoff request indicating that the mobile station is requesting that a first pseudorandom number (PN) offset be added to an active set for the mobile station, the active set comprising one or more macro-network sectors;
   determining that the first PN offset is associated with an LCIB pilot beacon, and responsively identifying a candidate set of LCIBs, the candidate set consisting of a plurality of LCIBs that are located in the one or more macro-network sectors in the active set; and
   determining whether the mobile station is an authorized mobile station of exactly one LCIB in the candidate set and, if so, directing the mobile station to handoff to that LCIB, wherein a given mobile station being an authorized mobile station of a given LCIB comprises the given mobile station being permitted by the given LCIB to conduct one or more communication sessions via the given LCIB whether the given LCIB is operating in a restricted mode or in an unrestricted mode.

2. The method of claim 1, further comprising:
   further in response to determining that the first PN offset is associated with an LCIB pilot beacon, initially denying the handoff request.

3. The method of claim 1, wherein the candidate set consists of all of the LCIBs that are located in the one or more macro-network sectors in the active set.

4. The method of claim 1, further comprising:
   if it is not the case that the mobile station is an authorized mobile station of exactly one LCIB in the candidate set, then modifying the candidate set by removing therefrom: (a) any LCIBs that are operating in a restricted mode and for which the mobile station is not an authorized mobile station and (b) any LCIBs that use a PN offset other than the first PN offset for emitting a respective pilot beacon; and
   determining whether, within an immediately preceding time period, the mobile station registered with an LCIB in the modified candidate set and, if so, directing the mobile station to handoff to that LCIB.

5. The method of claim 4, wherein the mobile station is engaged in an active communication session via a macro network on a first macro-network carrier, the method further comprising:
   if it is not the case that, within the immediately preceding time period, the mobile station registered with an LCIB in the modified candidate set, then directing the mobile station to handoff to whichever LCIB in the modified candidate set reports a greatest reverse noise rise (RNR) on the first macro-network carrier.

6. The method of claim 5, further comprising:
   instructing the LCIBs in the modified candidate set to report the RNR on the first macro network carrier; and
   receiving reports from the LCIBs in the modified candidate set, the reports reflecting the RNR on the first macro network carrier as measured at the respective LCIBs.

7. The method of claim 5, wherein the communication session is a voice call.

8. The method of claim 5, wherein the communication session is a data session.

9. The method of claim 5, carried out by a mobile switching center (MSC).

10. The method of claim 5, further comprising the mobile station detecting the first PN offset on the first macro-network carrier, and responsively sending the handoff request.

11. The method of claim 5, wherein the LCIB to which the mobile station is instructed to handoff is associated with a user of the mobile station.

12. The method of claim 5, wherein directing the mobile station to handoff to a given LCIB comprises sending the mobile station a directive message to re-tune to and operate on a traffic-bearing carrier provided by the given LCIB.

13. The method of claim 12, further comprising instructing the mobile station to report a PN offset of the traffic-bearing carrier provided by the given LCIB.

14. The method of claim 5, wherein the mobile station, the macro network, and the LCIB operate according to a code division multiple access (CDMA) protocol.

15. A macro-network entity for use in selecting a low-cost Internet base station (LCIB) to which to instruct a mobile station to handoff, the macro-network entity comprising:
   a communication interface;
   a processor; and
   data storage comprising instructions executable by the processor for:
      receiving a handoff request from the mobile station, the handoff request indicating that the mobile station is requesting that a first pseudorandom number (PN) offset be added to an active set for the mobile station, the active set comprising one or more macro-network sectors;
      determining that the first PN offset is associated with an LCIB pilot beacon, and responsively identifying a candidate set of LCIBs, the candidate set consisting of a plurality of LCIBs that are located in the one or more macro-network sectors in the active set; and
      determining whether the mobile station is an authorized mobile station of exactly one LCIB in the candidate set and, if so, directing the mobile station to handoff to that LCIB, wherein a given mobile station being an authorized mobile station of a given LCIB comprises the given mobile station being permitted by the given LCIB to conduct one or more communication sessions via the given LCIB whether the given LCIB is operating in a restricted mode or in an unrestricted mode.

16. The macro-network entity of claim 15, wherein the data storage further comprises instructions executable by the processor for:
   if it is not the case that the mobile station is an authorized mobile station of exactly one LCIB in the candidate set, then modifying the candidate set by removing therefrom: (a) any LCIBs that are operating in a restricted mode and for which the mobile station is not an authorized mobile station and (b) any LCIBs that use a PN offset other than the first PN offset for emitting a respective pilot beacon; and determining whether, within an immediately preceding time period, the mobile station registered with an LCIB in the modified candidate set and, if so, directing the mobile station to handoff to that LCIB.

17. The macro-network entity of claim 16, wherein the mobile station is engaged in an active communication session via a macro network on a first macro-network carrier, wherein the data storage further comprises instructions executable by the processor for:

if it is not the case that, within the immediately preceding time period, the mobile station registered with an LCIB in the modified candidate set, then directing the mobile station to handoff to whichever LCIB in the modified candidate set reports a greatest reverse noise rise (RNR) on the first macro-network carrier.

18. The macro-network entity of claim 15, wherein the macro-network entity is a mobile switching center (MSC).

19. The macro-network entity of claim 15, wherein the instructions for directing the mobile station to handoff to a given LCIB comprise instructions for sending the mobile station a directive message to re-tune to and operate on a traffic-bearing carrier provided by the given LCIB.

20. A method for selecting a low-cost Internet base station (LCIB) to which to instruct a mobile station engaged in an active communication session via a macro network on a first macro-network carrier to handoff, the method comprising:

receiving a handoff request from the mobile station, the handoff request indicating that the mobile station is requesting that a first pseudorandom number (PN) offset be added to an active set for the mobile station, the active set comprising one or more macro-network sectors;

determining that the first PN offset is associated with an LCIB pilot beacon, and responsively (a) initially denying the handoff request and (b) identifying a candidate set of LCIBs, the candidate set consisting of a plurality of LCIBs that are located in the one or more macro-network sectors in the active set;

determining whether the mobile station is an authorized mobile station of exactly one LCIB in the candidate set, wherein a given mobile station being an authorized mobile station of a given LCIB comprises the given mobile station being permitted by the given LCIB to conduct one or more communication sessions via the given LCIB whether the given LCIB is operating in a restricted mode or in an unrestricted mode, and, if so, directing the mobile station to handoff to that LCIB, and, if not:

modifying the candidate set by removing therefrom: (a) any LCIBs that are operating in a restricted mode and for which the mobile station is not an authorized mobile station and (b) any LCIBs that use a PN offset other than the first PN offset for emitting a respective pilot beacon;

determine whether, within an immediately preceding time period, the mobile station registered with an LCIB in the modified candidate set and, if so, directing the mobile station to handoff to that LCIB, and, if not:

instructing the LCIBs in the modified candidate set to report a reverse noise rise (RNR) on the first macro-network carrier, and directing the mobile station to handoff to whichever LCIB in the modified candidate set reports the greatest RNR on the first macro-network carrier.

* * * * *